US009746751B1

(12) United States Patent
Amit

(10) Patent No.: US 9,746,751 B1
(45) Date of Patent: Aug. 29, 2017

(54) CAMERA MOUNT SYSTEM

(71) Applicant: Yudah Amit, Eden Prairie, MN (US)

(72) Inventor: Yudah Amit, Eden Prairie, MN (US)

( * ) Notice: Subject to any disclaimer, the term of this patent is extended or adjusted under 35 U.S.C. 154(b) by 0 days.

(21) Appl. No.: 15/150,825

(22) Filed: May 10, 2016

Related U.S. Application Data

(60) Provisional application No. 62/316,464, filed on Mar. 31, 2016.

(51) Int. Cl.
  *G03B 17/56* (2006.01)
  *F16M 13/04* (2006.01)

(52) U.S. Cl.
  CPC .......... *G03B 17/561* (2013.01); *F16M 13/04* (2013.01)

(58) Field of Classification Search
  USPC ............................................. 396/426; 42/129
  See application file for complete search history.

(56) References Cited

U.S. PATENT DOCUMENTS

| 2,483,711 | A | * | 10/1949 | Roos | F16M 13/04 |
| | | | | | 294/139 |
| 3,105,430 | A | * | 10/1963 | Fernelius | F16M 13/04 |
| | | | | | 352/178 |
| 3,877,048 | A | * | 4/1975 | Kellner | G02B 7/04 |
| | | | | | 359/826 |
| 6,773,110 | B1 | * | 8/2004 | Gale | F16M 13/04 |
| | | | | | 348/211.4 |
| 7,854,556 | B2 | * | 12/2010 | Wood | G03B 17/00 |
| | | | | | 396/419 |
| 8,567,106 | B2 | * | 10/2013 | Chvala | F41A 23/10 |
| | | | | | 248/169 |
| 2005/0117898 | A1 | * | 6/2005 | DeSorbo | F16M 11/04 |
| | | | | | 396/422 |

OTHER PUBLICATIONS attached screenshots (NPL_SHARPSHOOTER.PDF) from website captured circa Apr. 23, 2016 http://www. sharpshooterindustries. com/index/php/products/sharpshooter-cameramount>>.
attached photograph (NPL_Bushhawkpdf) of "BushHawk" taken circa Feb. 23, 2016. The website <<www.bushhawk.com>> is apparently inactive.

* cited by examiner

*Primary Examiner* — Clayton E LaBalle
*Assistant Examiner* — Linda B Smith
(74) *Attorney, Agent, or Firm* — Ronald J. Koch

(57) ABSTRACT

A camera mount system having two camera mounts connected to a main rail and moveable longitudinally with respect to each other, for differing lens lengths. One of the mounts includes two rollers to allow the camera to be rotated relative to the shooting plane. A rifle-like arrangement is used wherein a handle, with trigger connected to the camera with a cable, and stock/butt stock is provided. The stock and butt stock are vertically and laterally adjustable to accommodate right and left handed use as well as proper shoulder alignment.

5 Claims, 4 Drawing Sheets

CAMERA MOUNT SYSTEM

The present application is related to the provisional patent application No. 62/316,464 of YUDAH AMIT, filed Mar. 31, 2016, entitled "CAMERA MOUNT SYSTEM", and based on which priority is herewith claimed under 35 U.S.C. 119(e) and the disclosure of which is incorporated herein by reference in its entirety as if fully rewritten herein.

BACKGROUND AND SUMMARY

The present invention relates generally to photography and specifically to camera accessories. Existing camera mount systems are lacking in that they do not provide an adequate way to steadily hold the cameras with long lenses while shooting birds in flight and fast moving objects and people (e.g. car racing, football, baseball). Existing systems are problematic in that they do not allow vertical and lateral alignment of the camera lens with the user's eye, they do not accommodate long lenses, and they do not allow rotation of the camera relative to the horizontal plane.

The present invention overcomes the various problems described herein as well as those familiar to those of skill in the art. Two camera mounts connected to a main rail and moveable longitudinally with respect to each other, for differing lens lengths. One of the mounts includes two rollers to allow the camera to be rotated relative to the shooting plane. The camera and lens are simply set upon the two mounts. A rifle-like arrangement is used wherein a handle, with trigger connected to the camera with a cable, and stock/butt stock is provided. The stock and butt stock are vertically and laterally adjustable to accommodate right and left handed use as well as proper shoulder alignment.

One advantage of the present invention is that it can be quickly assembled & disassembled to place inside of luggage and to prevent accidental misidentification as a weapon.

REFERENCE NUMERALS IN DRAWINGS

Figure 1:
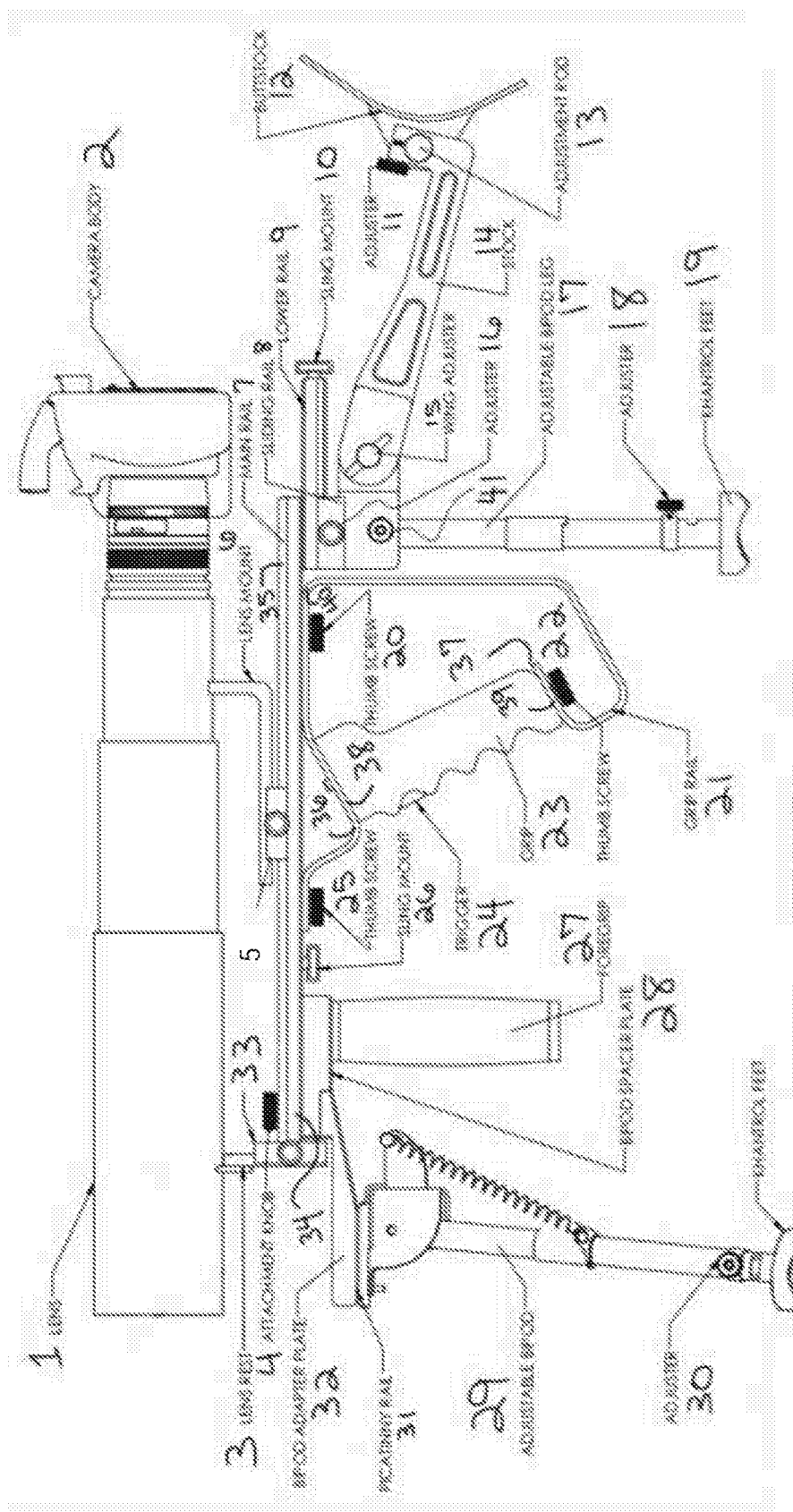
FIG. 1 depicts a side view of the invention

The table below lists the reference numerals employed in the figures, and identifies the element designated by each numeral.

1 camera lens 1
2 camera body 2
3 lens rest 3
4 attachment knob 4
5 sliding clamps 5
6 lens mount 6
7 main rail 7
8 sliding rail 8
9 lower rail 9
10 first sling mount 10
11 first adjuster 11
12 buttstock 12
13 adjustment rod 13
14 stock 14
15 wing adjuster 15
16 second adjuster 16
17 first adjustable bipod (ENABLE CAN BE UNIPOD) 17
18 third adjuster 18
19 khantol feet (ENABLE CAN BE ONLY ONE FOOT) 19
first thumb screw 20
21 grip rail 21
22 second thumb screw 22
23 grip 23
24 trigger 24
25 third thumb screw 25
26 second sling mount 26
27 foregrip 27
28 bipod spacer plate 28
29 second adjustable bipod 29
30 fourth adjuster 30
31 picatinny rail 31
32 bipod adapter plate 32
33 second sliding clamp 33
34 proximal portion 34 of main rail 7
35 distal portion 35 of main rail 7
36 proximal protruding portion 36 of grip rail 21
37 distal curved portion 37 of grip rail 21
38 proximal end 38 of grip 23
39 distal end 39 of grip 23
40 right angle 40 of grip rail 21
41 rear leg release (aka lock) screw 41
42 swiss acra plate 42
43 rubber stop 43
44 ¼ 20 button head cap screw 44
3A lens rest rollers 3A
36A proximal protruding portion 36A of grip rail 21

DETAILED DESCRIPTION

Figure 3:
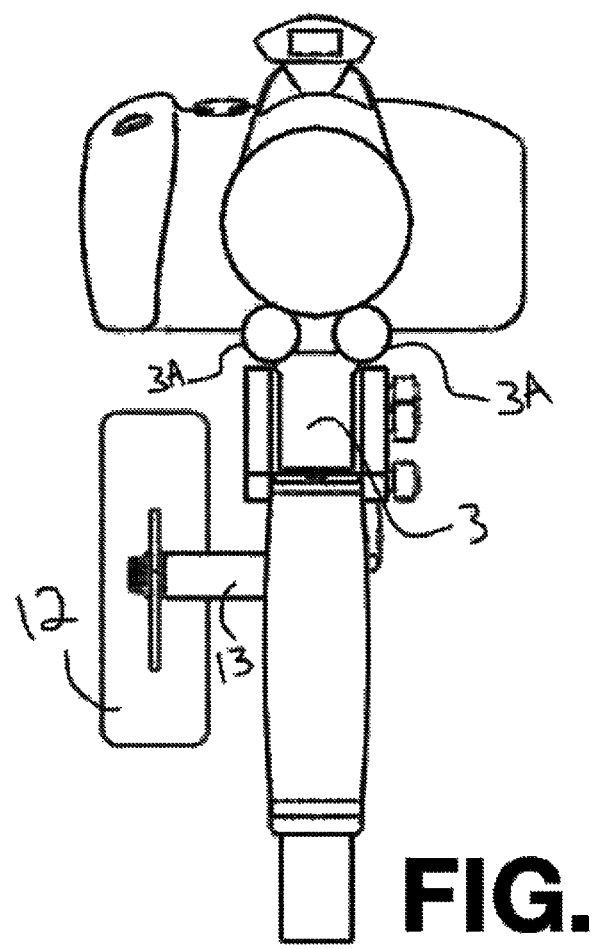
FIG. 3 depicts a front view of the invention

Main rail 7 is adapted to rotatingly engage camera lens 1 via lens rest 3 and lens mount 6 whereby camera lens 1 (connected to camera body 2) can be rotated to different positions (portrait, landscape, and in between). Lens rest 3 includes two rollers 3A (FIG. 3).

Lens mount 6 is slidingly engaged to main rail 7 via first sliding clamp 5. First sliding clamp 5 has locked and unlocked positions. Lens mount 6 is longitudinally slidingly moveable relative to main rail 7 to accommodate different lens sizes. Lens rest 3 is slidingly engaged to main rail 7 via second sliding clamp 33 and is vertically moveable with respect to main rail 7 to accommodate different lens sizes.

First adjustable bipod 17 is in pivotable communication with main rail 7. Bipod adapter plate 32 is connected to bipod spacer plate 28. Bipod spacer plate 28 is connected to the underside of main rail 7 near proximal portion 34 of main rail 7. Picatinny rail 31 is connected to bipod spacer plate 28. First adjustable bipod 17 is pivotably connected to picatinny rail 31.

Foregrip 27 is removably connected (via attachment knob 4) to main rail 7 near proximal portion 34 of main rail 7. Foregrip 27 is connected to bipod spacer plate 28. Lower rail 9 is connected to main rail 7 near distal portion 35 of main rail 7. Sliding rail 8 is slindingly engaged to lower rail 9 and longitudinally moveable with respect to lower rail 9.

Figure 4:
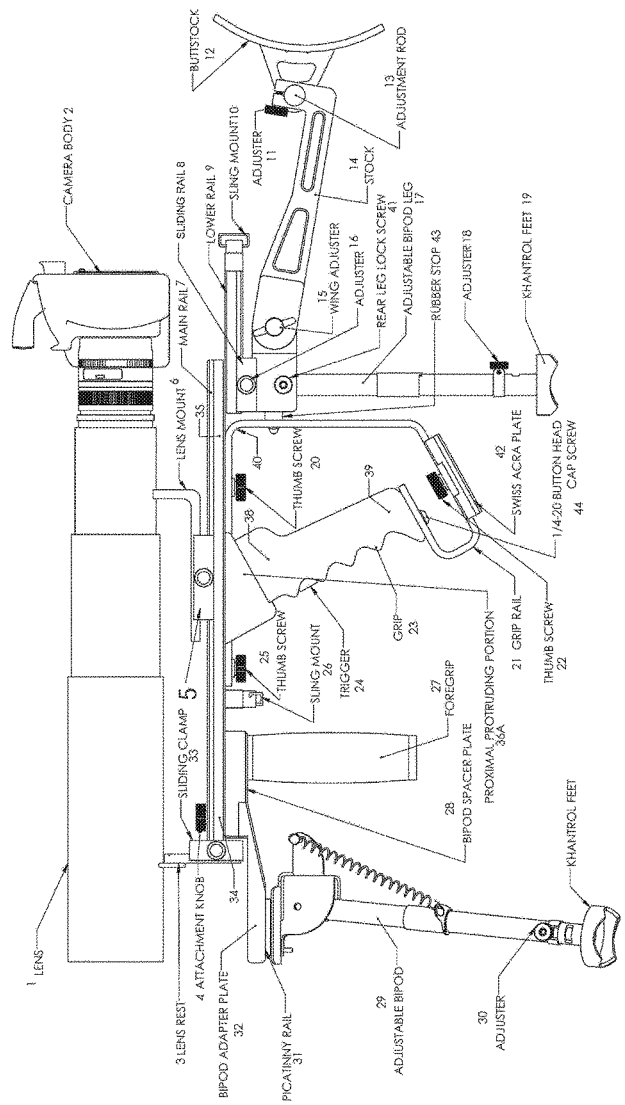
FIG. 4 depicts a side view of an alternative embodiment of the invention

Second adjustable bipod 29 is in pivotable communication with sliding rail 8 via second adjuster 16. Second adjuster 16 is a locking knob for the rear leg to enable removal and use of the mount without the bipod and the rear leg. Swiss acra plate 42 is connected to bottom grip rail 21 as shown in FIG. 4, for mounting on a tripod with ballhead (not shown) if desired.

Stock 14 pivots with respect to sliding rail 8 to a desired position and is locked in place by wing adjuster 15. Buttstock 12 pivots about adjustment rod 13 to a desired position and is then locked in place by first adjuster 11.

In one embodiment, grip rail 21 is removably connected to main rail 7 between foregrip 27 and sliding rail 8. Grip rail 21 is formed of unitary piece of flat bar stock (or injection molded), and has proximal protruding portion 36 (shaped as shown in FIG. 1). A substantially right angle is imposed between proximal protruding portion 36 and distal curled portion 37. First thumb screw 20 connects grip rail 21 to main rail 7 near proximal protruding portion 36. Second thumb screw 22 removably connects grip rail 21 to main rail 7 near right angle 40.

Grip 23 has an integral trigger 24, and is attached to grip rail 21. Trigger 24 is operatively connected to camera body 2 via a cable (not shown) in accordance with systems familiar to those of skill in the art.

Proximal end 38 of grip 23 is connected to proximal protruding portion 36 of grip rail 21. Distal end 39 of grip 23 is connected to distal curled portion 37 of grip rail 21 via third thumb screw 25. As shown in FIG. 1, grip 23 is downwardly oriented with respect to main rail 7. First sling mount 10 is connected to the underside of main rail 7.

First and second adjustable bipods 17, 19 are each extendable and can be locked into place by third and fourth adjusters, 18 & 30, respectively. First and second adjustable bipods 17, 19 include feet (aka khantrol feet). It is to be understood that unipods (not shown) can be used in place of bipods. Second sling mount 26 is connected to the end of lower rail 9.

In one embodiment, grip rail 21 is made from 1"×3/16" aluminum bar stock which is preferred to an alternate embodiment of 1"×1/8".

Figure 2:
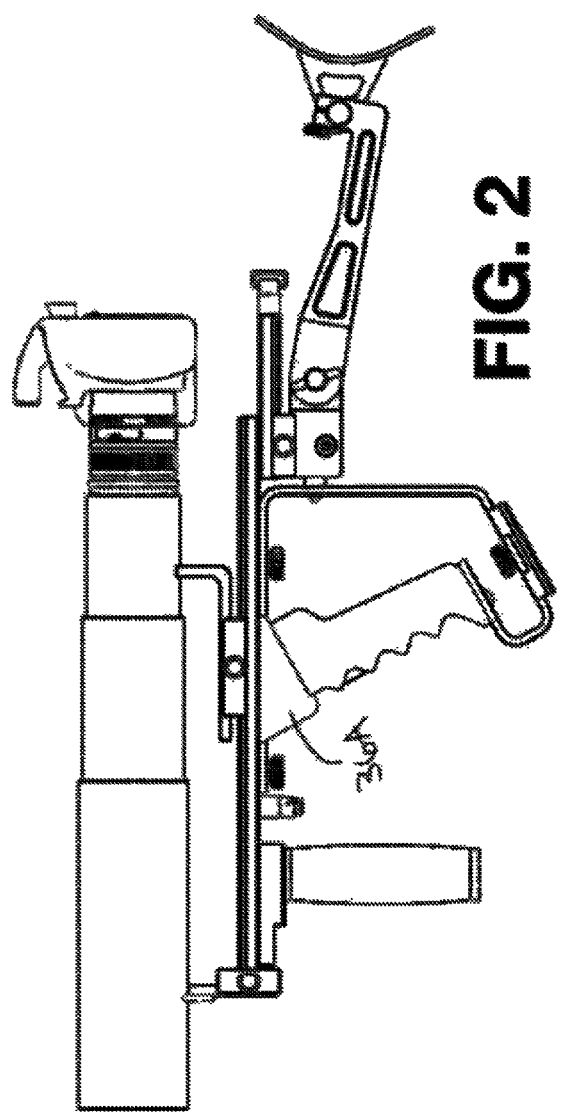
FIG. 2 depicts a side view of an alternative embodiment of the invention

In an alternative embodiment (FIG. 4), proximal protruding portion 36A (FIG. 2) is attached to grip rail 21 as opposed to being formed as part of the unitary piece of flat bar stock. Swiss acra plate 42 is connected to grip rail 21 proximate distal curved portion 37 of grip rail 21. Those of skill in the art will appreciate the functionality of swiss acra plate 42. It allows the entire assembly to be mounted to a conventional tripod (not shown).

In one embodiment (FIG. 3), stock 14 is pivotally connected to an adjustment rod 13, buttstock 12 is also pivotally connected to adjustment rod 13 such that buttstock 12 can rotate relative to stock 14. This arrangement allows vertical adjustment to align with a user's shoulder. This arrangement also allows buttstock 12 to be laterally offset to either side of stock 14 to accommodate aligning the camera's view finder for left and right-handed persons. FIG. 3 depicts such an arrangement.

What is claimed is:

1. A camera mount system comprising:
    a main rail adapted to rotatingly engage a camera lens via a lens rest and a lens mount,
        the lens mount being slidingly engaged to the main rail via a first sliding clamp
            the lens mount being longitudinally slidingly moveable relative to the main rail;
    a lens rest being slidingly engaged to the main rail via a second sliding clamp,
        the lens rest being vertically moveable with respect to the main rail;
    a first adjustable leg in pivotable communication with the main rail;
    a foregrip removably connected to the main rail near a proximal portion of main rail;
    a lower rail connected to the main rail near a distal portion of the main rail;
    a sliding rail being slidingly engaged to the lower rail and longitudinally moveable with respect to the lower rail;
    a second adjustable leg in pivotable communication with the sliding rail;
    a stock being in pivotal communication with the sliding rail;
    and a buttstock being in pivotal communication with the stock.

2. The camera mount system of claim 1 further comprising:
    a grip rail removably connected to the main rail intermediate the foregrip and the sliding rail;
    a grip, having an integral trigger, the grip being attached to the grip rail;
    the grip rail:
        being formed of a unitary piece of flat bar stock,
        having a proximal protruding portion,
        having a distal curled portion;
    the grip having,
        a proximal end connected to the proximal protruding portion of the grip rail,
        and a distal end connected to the distal curled portion of the grip rail.

3. The camera mount system of claim 2 further comprising:
    the grip being downwardly oriented with respect to the main rail.

4. The camera mount system of claim 1 further comprising:
    a swiss acra plate connected to the grip rail proximate the distal curled portion.

5. The camera mount system of claim 1 further comprising:
    the stock being pivotally connected to an adjustment rod;
    the buttstock being pivotally connected to the adjustment rod;
    whereby the buttstock can rotate relative to the stock;
    further whereby the buttstock can be laterally offset relative to the stock.

* * * * *